(12) United States Patent
Mueck (10) Patent No.: US 9,674,706 B2
(45) Date of Patent: Jun. 6, 2017

(54) DATABASE COORDINATOR PROCESSOR AND METHOD FOR PROVIDING CERTIFICATION INFORMATION

(75) Inventor: Markus Dominik Mueck, Unterhaching (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 421 days.

(21) Appl. No.: 13/294,214

(22) Filed: Nov. 11, 2011

(65) Prior Publication Data

US 2013/0122889 A1 May 16, 2013

(51) Int. Cl.
H04L 29/06 (2006.01)
H04W 12/08 (2009.01)

(52) U.S. Cl.
CPC .................................. *H04W 12/08* (2013.01)

(58) Field of Classification Search
CPC . H04L 63/0823; H04L 63/0853; G06F 21/33; G06F 21/00; H04W 12/08
USPC .......... 455/419; 707/3, 5, 669, 770; 713/156
See application file for complete search history.

(56) References Cited

U.S. PATENT DOCUMENTS

| 5,519,858 A * | 5/1996 | Walton et al. | |
|---|---|---|---|
| 2002/0099690 A1* | 7/2002 | Schumacher | 707/1 |
| 2002/0112034 A1* | 8/2002 | Feik | 709/219 |
| 2003/0074555 A1* | 4/2003 | Fahn et al. | 713/156 |
| 2003/0100297 A1* | 5/2003 | Riordan et al. | 455/418 |
| 2004/0048608 A1* | 3/2004 | Matsuo et al. | 455/418 |
| 2007/0073664 A1* | 3/2007 | Ahn | 707/3 |
| 2007/0260877 A1* | 11/2007 | Adams et al. | 713/156 |
| 2008/0064405 A1* | 3/2008 | Rasanen | 455/436 |
| 2008/0163334 A1* | 7/2008 | Perich et al. | 726/1 |
| 2009/0019007 A1* | 1/2009 | Niina | 707/3 |
| 2009/0049031 A1* | 2/2009 | Hepburn | 707/5 |
| 2010/0105418 A1 | 4/2010 | Kaplan | |
| 2010/0274805 A9* | 10/2010 | Tanabe et al. | 707/770 |
| 2010/0313249 A1* | 12/2010 | Castleman | 726/5 |

(Continued)

FOREIGN PATENT DOCUMENTS

| CN | 101069437 A | 11/2007 |
|---|---|---|
| CN | 101840433 A | 9/2010 |
| WO | 2011042590 A1 | 4/2011 |

OTHER PUBLICATIONS

English abstract of CN 11840433 A.

(Continued)

*Primary Examiner* — Farid Homayounmehr
*Assistant Examiner* — Christopher C Harris
(74) *Attorney, Agent, or Firm* — Schwabe, Williamson & Wyatt, P.C.

(57) ABSTRACT

According to an embodiment, a database coordinator processor is described comprising a memory configured to store, for a plurality of databases storing hardware certificates or software certificates an indication, for each certificate, of the database of the plurality of databases in which the certificate is stored; a receiver configured to receive, for a certificate, a request from a communication device for an indication of a database in which the certificate is stored; a determiner configured to determine from the memory a database in which the certificate for which the request has been received is stored; and a transmitter configured to transmit a message to the communication device indicating the determined database.

8 Claims, 6 Drawing Sheets

(56) References Cited

U.S. PATENT DOCUMENTS

| | | | | |
|---|---|---|---|---|
| 2010/0317335 | A1* | 12/2010 | Borovsky et al. | 455/419 |
| 2011/0281555 | A1* | 11/2011 | Etemad | 455/411 |
| 2012/0079269 | A1* | 3/2012 | Brown et al. | 713/156 |
| 2012/0185429 | A1* | 7/2012 | Shu et al. | 707/609 |

OTHER PUBLICATIONS

Dr. Markus Mueck / Georges de Brito, ETSI TC RRS considerations on revision of R&TTE Directive, The R&TTE framework and the regulatory issues raised by SDR / Possible enhancements to the R&TTE framework in order to address SDR, pp. 1-3, Published : 2010 (best date available).
Official Journal of the European Communities, Directive 1995/5/EC of the European Parliament and of the Council of Mar. 9, 1999, http://eur-lex.europa.eu/LexUriServ/LexUriServ.do?uri=CELEX:31999L0005:en.NOT, Release: Apr. 7. 1999, pp. 1-19.
http://transition.fcc.gov/oet/cognitiveradio/, Cognitive Radio Technologies Proceeding (CRTP) ET Doc. No. 03-108, Published : 2003 (best date available).
Remarks of Jonathan S. Adelstein, Commissioner, Federal Communication Commission, Workshop on Cognitive Radio Technologies, Washington, DC, corrected publication date: May 19, 2003, pp. 1-2.
Bruce Fette PhD, Chief Scientist, General Dynamics Decision Systems, General Dynamics Decision Systems, SDR Technology Implementation for the Cognitive Radio, May 16, 2003, pp. 1-32.
Bill Lane, Ph. D., PE, Cognitive Radio Technologies in the Commercial Arena, FCC Cognitive Radio Workshop, May 19, 2003, pp. 1-13.
Michael Marcus, Sc. D., Cognitive Radio Technologies in the Public Safety & Governmental Arenas, Cognitive Radio Workshop, May 19, 2003, pp. 1-16.
Preston Marshall, Beyond the Outer Limites—Next Generation Communications, FCC Cognitive Radio Conference, May 19, 2003, pp. 1-12.
Mark McHenry, Frequency Agile Spectrum Access Technologies, FCC Workshop on Cognitive Radios, May 19, 2003, pp. 1-25.
Spectrum Policy and Technology, Spectrum Access and the Promise of Cognitive Radio Technology, May 19, 2003, pp. 1-11.
Lauren Van Wazer, News Federal Communications Commission, The Office of Engineering and Technology hosting Workshop on Cognitive Radio Technologies May 19, 2003, Washington, D.C., May 16, 2003; pp. 1-5.
Lauren Van Wazer, News Federal Communications Commission, The Office of Engineering and Technology to host Workshop on Cognitive Radio Technologies, Washington, D.C., Apr. 25, 2003; pp. 1-4.
Bruce Romano, News Federal Communications Commission, FCC Adopts Rule Changes for Smart Radios, Washington, D.C., Mar. 10, 2005; pp. 1-2.
FCC 05-57 Federal Communications Commission, Report and Order, Washington, D.C., Mar. 11, 2005, pp. 1-42.
Commissioner Jonathan S. Adelstein, Separate Statement of Commissioner Jonathan S. Adelstein, (1 page), Published : 2005 (best date available).
FC 03-322 Federal Communications Commission, Notice of Proposed Rule Making and Order, Washington, D.C., Dec. 30, 2003, pp. 1-53.
Lauren Van Wazer, News Federal Communications Commission, FCC Opens Proceeding on Smart Radio, Washington, D.C., Dec. 17, 2003; pp. 1-2.
Chairman Michael K. Powell, Separate Statement of Chairman Michael K. Powell, (1 page), Published : 2003 (best date available).
Commissioner Michael J. Copps, Separate Statement of Commissioner Michael J. Copps, (1 page), Published : 2003 (best date available).
Commissioner Kevin J. Martin, Separate Statement of Commissioner Kevin J. Martin, pp. 1-2, Published : 2003 (best date available).
Commissioner Jonathan S. Adelstein, Separate Statement of Commissioner Jonathan S. Adelstein, (1 page), Published : 2003 (best date available).
Public Notice, Commission Docket Created in Connection With OET Workshop on Cognitive Radio Technologies, ET Docket No. 03-108, Washington, D.C., May 2, 2003, pp. 1-2.
Federal Communications Commission DA 03-1022, Order Granting Extension of Time, Washington, D.C., Mar. 31, 2003, (1 page).
Federal Communications Commission FCC 00-402, Notice of Proposed Rulemaking, Washington, D.C., Nov. 27, 2000, pp. 1-60.
FCC White Spaces Access Rules: "Unlicensed Operation in the TV Broadcast Bands", Final Rules Federal Register/vol. 74, No. 30/Feb. 17, 2009/Rules and Regulations, (http://edocket.access.gpo.gov/2009/pdf/E9-3279.pdf), pp. 1-18.
"Technical and Operational Requirements for the Operation of Cognitive Radio Systems in the "White Spaces" of the Frequency Band 470-790 MHz"; ECC Report 159: Cardiff; Jan. 2011, http://www.erodocdb.dk/Docs/doc98/official/pdf/ECCREP159.PDF, pp. 1-160.
Markus Mueck, Marco Di Renzo, Merouane Debbah and Tobias Renk Combination of Centralized & Decentralized Database and Terminal-based Spectrum Sensing for Secondary Spectrum Access, ICWITS 2010 conference, pp. 1-4, Published : 2010 (best date available).
Cognitive Radio Technologies Workshop [Real Audio], http://transition.fcc.gov/oet/cognitiveradio/), Published : 2010 (best date available).
Chinese Patent Office; First Office Action for Chinese App. No. 201210445943.6, dated Jul. 23, 2015; 19 pages, inclusive of English translation.
Chinese Office Action; State Intellectual Property Office, P.R. China for Chinese Application No. 201210445943.6 mailed on Apr. 6, 2016; 18 pages.

* cited by examiner

DATABASE COORDINATOR PROCESSOR AND METHOD FOR PROVIDING CERTIFICATION INFORMATION

TECHNICAL FIELD

Embodiments generally relate to a database coordinator processor and a method for providing certification information.

BACKGROUND

Mobile communication terminals may use different hardware and software that may require certificates to be allowed to be operated, for example in a certain regulatory region. Efficient approaches for supplying communication terminals with required certificates are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The European commission is currently in the process of creating a revision of the R&TTE (Radio equipment and telecommunications terminal equipment and the mutual recognition of their conformity) Directive. This directive can be seen as the fundamental regulatory basis for operating radio equipment and as the key basis for operating wireless mobile user communication devices (such as handsets, etc.).

In the new revision of the R&TTE Directive, the European Commission wants to make sure that flexible radio platforms (such as next generation platforms building on SDR) are supported. From a regulatory perspective, the following aspects may be seen to be important to be taken into account in order to enable software updates and thus provision of new air interfaces, cognitive radio features, after the sale of a wireless communication device:

The possibility of a digital and/or dynamic DoC (Declaration of Conformity) for the wireless communication device;

The possibility of a digital and/or dynamic CE (Conformité Européenne) marking of the wireless communication device;

A registration process to register the wireless communication device, one or more of its hardware components and/or one or more of its software components (e.g. as used device or hardware/software components in a certain mobile network);

The provision of a list of authorized third party software for the wireless communication device or one or more of its hardware components (or generally authorized third party software providers);

The provision of security checks for the wireless communication device (e.g. security checks to avoid inappropriate downloads etc.);

Storing a SDR (Software Defined Radio) reconfiguration log history of the wireless communication device;

Provision of information about interfaces to access operator services.

For storing the information necessary for providing these features the introduction of one or more databases can be expected to be required. Further databases may include context information in general, such as radio context information, etc. Furthermore, the FCC (Federal Communications Commission) recently introduced the possibility for using white spaces for opportunistic spectrum use. For this, databases storing for example information about current spectrum usage may be required. In Europe, a similar approach is considered in the regulatory group CEPT WG SE. A centralized or a distributed database approach may be used for these purposes.

According to one embodiment, means related to the efficient combination of various databases storing some or all of the information described above and possibly further databases, are provided. Also, mechanisms are introduced for efficiently deciding which information should be made available in local databases and which information should be stored in central databases. According to one embodiment, a network component referred to as "Database Coordination Entity (DCE)" is introduced according to one embodiment.

Such a database coordination entity may for example be implemented or include a database coordinator processor as described in the following with reference to FIG. 1.

Figure 1:
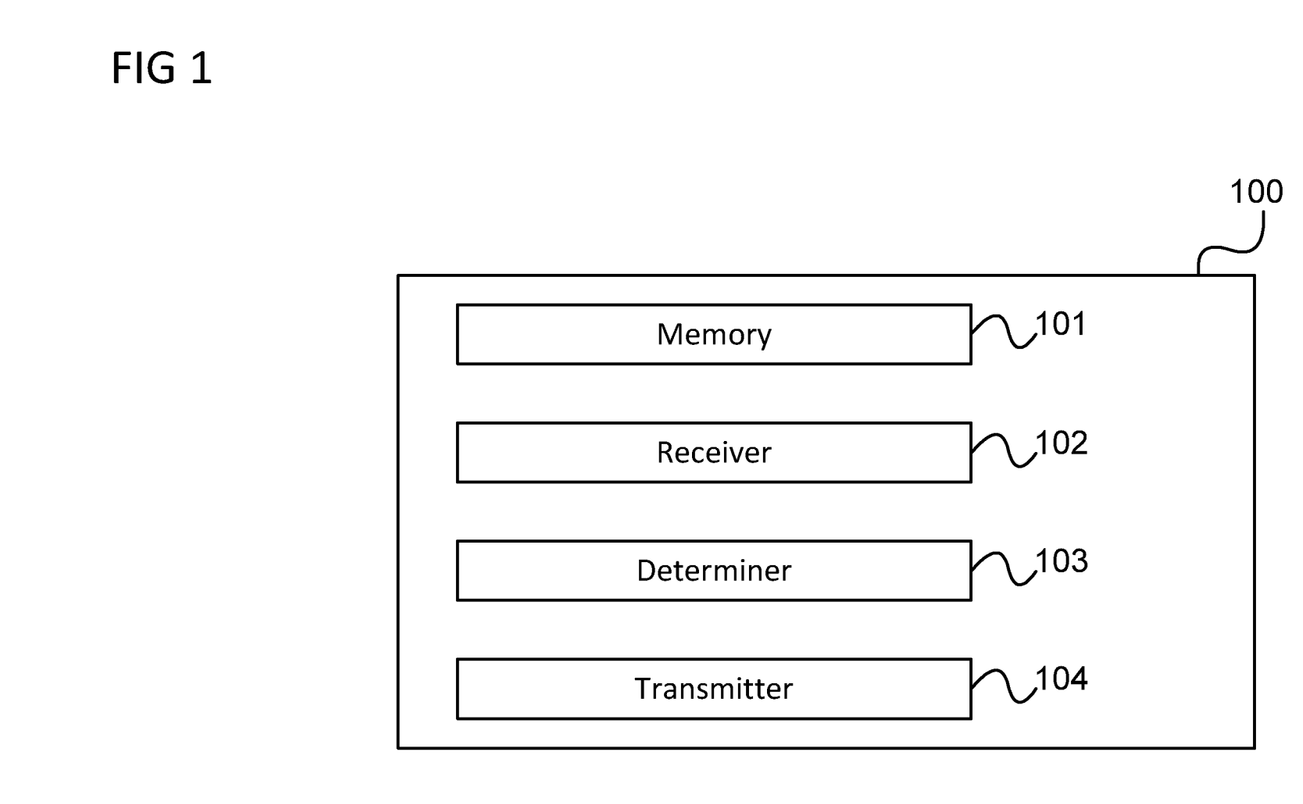
FIG. 1 shows database coordinator processor according to an embodiment.

FIG. 1 shows database coordinator processor 100 according to an embodiment.

The database coordinator processor 100 is for example part of a communication system including a mobile communication network.

The database coordinator processor 100 includes a memory 101 configured to store, for a plurality of databases, each database storing at least one of one or more hardware certificates specifying, for a communication terminal, whether a certain hardware may be may be operated by the communication terminal in the mobile communication network and one or more software certificates specifying, for the communication terminal, whether a certain software may be may be operated by the communication terminal in the mobile communication network, for each hardware certificate and each software certificate, an indication of the database of the plurality of databases in which the certificate is stored.

The database coordinator processor 100 further includes a receiver 102 configured to receive, for a hardware certificate or a software certificate, a request from a communication device for an indication of a database of the plurality of databases in which the certificate is stored.

Additionally, the database coordinator processor 100 includes a determiner 103 configured to determine from the memory a database of the plurality of databases in which the certificate for which the request has been received is stored and a transmitter 104 configured to transmit a message to the communication device indicating the determined database.

In other words, in one embodiment, the database coordinator processor has knowledge about which database or which databases of a plurality of databases store a certain hardware or software certificate that has been requested and indicates this database to the requesting communication terminal.

In one embodiment, the databases may be certificate servers. In this case, the database coordinator processor can be seen as a certificate server coordinator processor.

A hardware or software certificate may be a dynamic certificate. For example, the certificate may be issued for a certain configuration of the communication terminal but may not be valid if the configuration of the communication terminal is changed (e.g. if additional software is installed on the communication terminal). Additionally, the validity of the certificate may limited in time, i.e. the certificate may lose its validity after a certain time. For example, in contrast to a static certificate a dynamic certificate may refer to a certificate which can be given on a per-user basis or to small groups of users. Such a dynamic certificate may be given to (or used for) software only while the hardware aspects may be covered by one or more static certificates. This means that in one embodiment, the databases store (dynamic) software certificates while hardware aspects are covered using static certificates not necessarily stored in the databases.

The communication device sending the request may for example be the communication terminal itself but may also be another communication device, for example a network component of the mobile communication network or also of another mobile communication network. For example, a network operator may, using the communication device, request the database in which a certificate is stored for a communication terminal that has just entered the mobile communication network operated by the network operator. Thus, the network operator can for example check which software and/or hardware the communication terminal is certified to use and may react accordingly (e.g. inform the communication terminal that certain software and hardware for which it has been certified may not be used in his mobile communication network since it is not compatible with the operator's network). Similarly, information about the location of certificates (i.e. the database storing the certificates) issued to a communication terminal may be requested by a network component when the communication terminal enters a different country (or generally a different regulatory region) to check which software and/or hardware was certified to be allowed to be used by the communication terminal to ensure that this is also in compliance with the requirements in the country (or regulatory region) entered by the communication terminal.

The databases for example stores each hardware certificate and/or each software certificate in association with an indication (e.g. by means of an identification) of the communication terminal to which the certificate has been issued.

According to one embodiment, the communication terminal is a subscriber terminal of the mobile communication network.

The mobile communication network is for example a cellular mobile communication network.

According to one embodiment, the database coordinator processor further includes a requesting circuit configured to request data from a further communication terminal.

The data are for example data to be stored in one or more of the plurality of databases.

The data for example include at least one of a hardware certificate specifying whether the further communication terminal is allowed to operate a certain hardware in the mobile communication network and a software certificate specifying whether the further communication terminal is allowed to operate a certain software in the mobile communication network.

The requesting circuit is for example configured to request the data upon request of a database of the plurality of databases.

According to one embodiment, the receiver is further configured to receive information, for at least one database of the plurality of databases, which at least one hardware certificate or software certificate is stored by the database.

According to one embodiment, the receiver is further configured to receive information that a database of the plurality of databases has been set up.

According to one embodiment, the transmitter is further configured to, upon an update of a hardware certificate or a software certificate stored in a database of the plurality of databases to send an update message to another database of the plurality of databases storing the hardware certificate or the software certificate, wherein the message informs the other database about the update.

Each database of the plurality of databases is for example associated with a geographical region. The databases may for example be associated with different geographical regions (e.g. different radio cells or different regulatory regions such as countries).

At least one database of the plurality of databases for example stores information about at least one radio access network available in the geographical region associated with the database.

At least one database of the plurality of databases for example stores information about spectrum usage in the geographical region associated with the database.

At least one database of the plurality of databases may store configuration information for communication terminal operation in the geographical region associated with the database.

According to one embodiment, the transmitter is further configured to transmit information for accessing the determined database.

According to one embodiment, the request includes an indication of the hardware or the software and the determiner is configured to determine the database of the plurality of databases in which the certificate for which the request has been received is stored based on the indicated hardware or software.

According to one embodiment, the request includes an indication of a type of the communication terminal and the determiner is configured to determine the database of the plurality of databases in which the certificate for which the request has been received is stored based on the type of the communication terminal.

Figure 2:
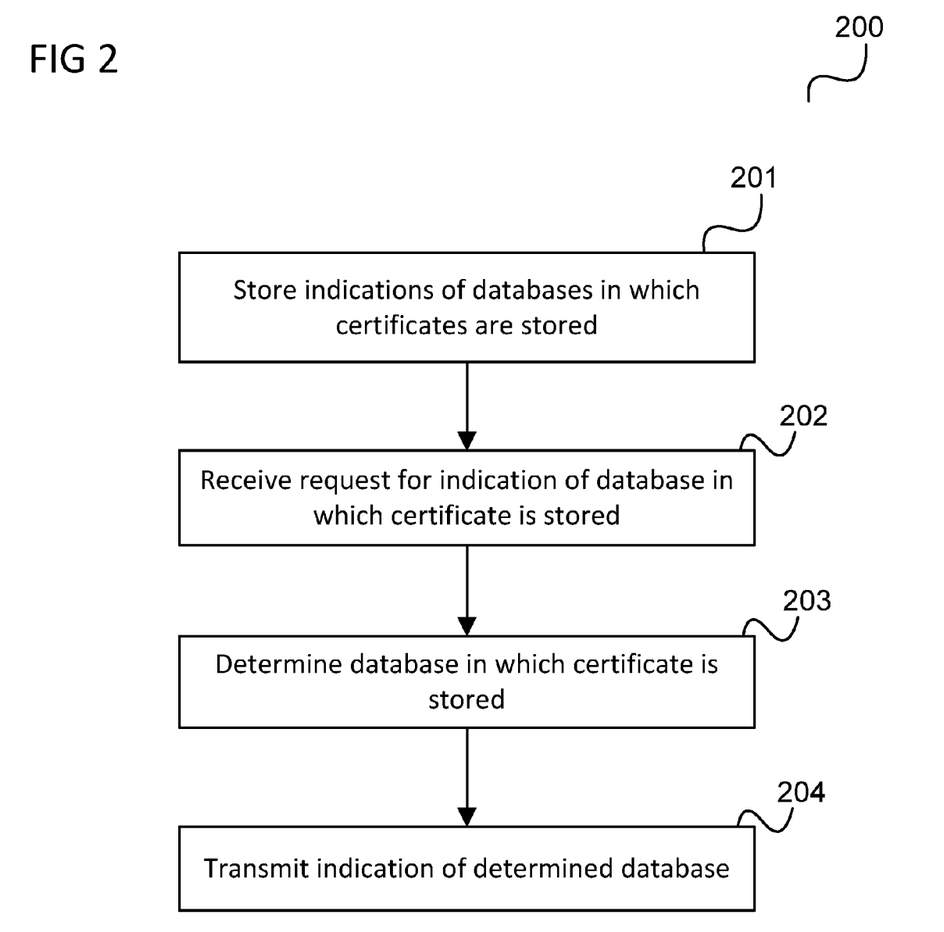
FIG. 2 shows a flow diagram according to an embodiment.

The database coordinator processor for example carries out a method as illustrated in FIG. 2.

FIG. 2 shows a flow diagram 200 according to an embodiment.

The flow diagram 200 illustrates a method for providing certification information in a communication system including a mobile communication network.

In 201, for a plurality of databases, each database storing at least one of

- one or more hardware certificates specifying, for a communication terminal, whether a certain hardware may be may be operated by the communication terminal in the mobile communication network and
- one or more software certificates specifying, for the communication terminal, whether a certain software may be may be operated by a communication terminal in the mobile communication network, and for each hardware certificate and each software certificate, an indication is stored of the database of the plurality of databases in which the certificate is stored.

In 202, for a hardware certificate or a software certificate, a request is received from a communication terminal for an indication of a database of the plurality of databases in which the certificate is stored.

In 203, a database of the plurality of databases in which the certificate for which the request has been received is stored is determined from the memory.

In 204, a message indicating the determined database is transmitted to the communication device.

According to one embodiment, an efficient combination of databases in the framework of wireless communications is addressed. According to one embodiment, the efficient selection of content for centralized and distributed storage and the efficient distribution of database contents to distributed/centralized databases is addressed.

Embodiments are described in the following in more detail.

Figure 3:
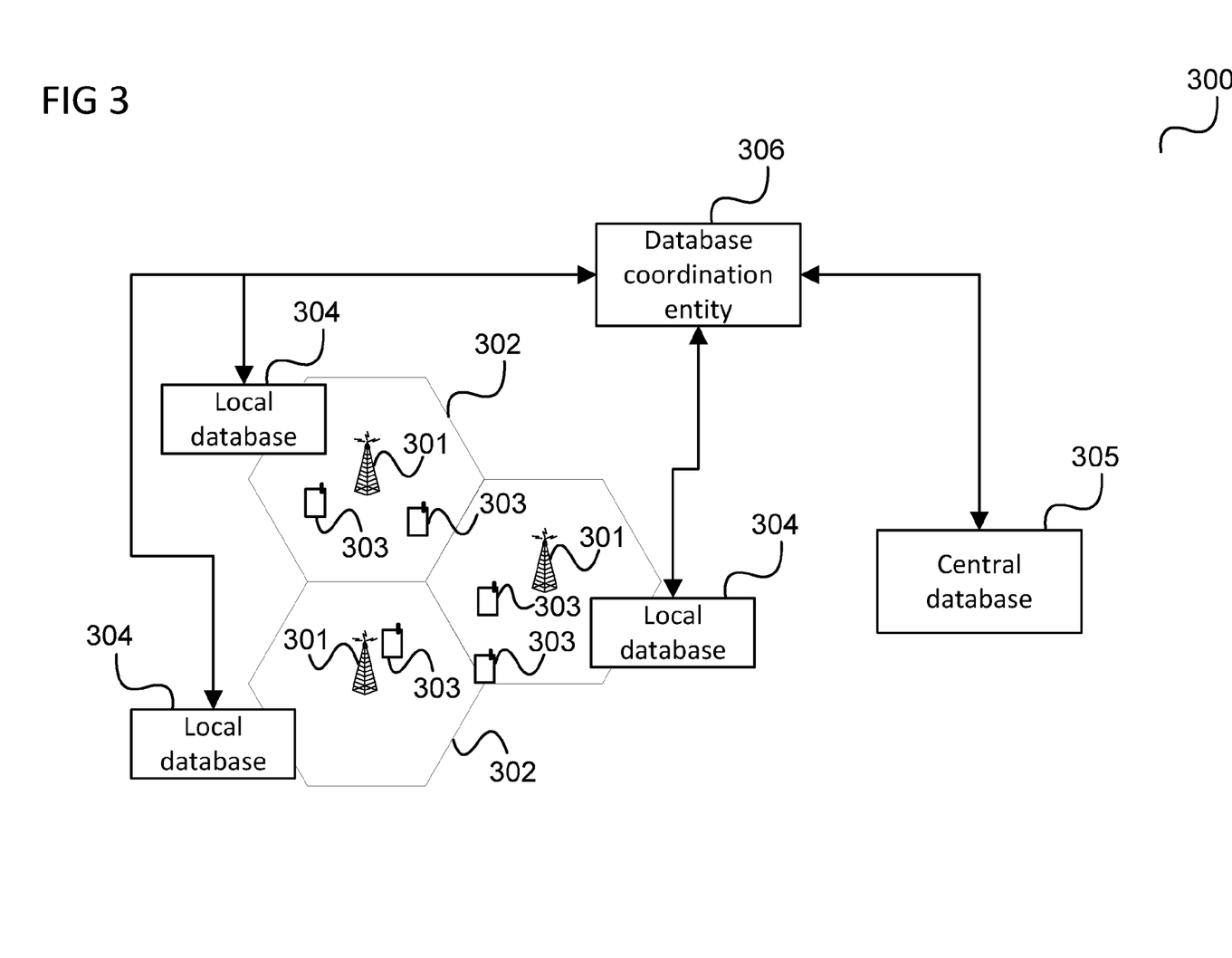
FIG. 3 shows a communication system according to an embodiment.

FIG. 3 shows a communication system 300 according to an embodiment.

The communication system 300 includes a wireless radio access network including a plurality of base stations 301, wherein each base station 301 operates a radio cell of a plurality of radio cells 302.

Mobile devices 303, e.g. communication terminals such as cell phones or laptop computers, may be located in the radio cells 302 and may be provided by the base stations 301 with radio access to, for example, a core network (not shown).

For each radio cell 302, the communication system 300 further includes a local database 304 associated with the radio cell 302. This can be seen as a local database 304 being provided for a certain geographic area, i.e. a certain part of the coverage area, of the wireless radio access network.

The communication system 300 further includes a central database 305. The local databases 304 and the central database 305 are connected to a database coordination entity (DCE) 306. The central database may for example store data that changes at a lower rate compared to the data stored in the local databases.

In one embodiment, the communication system 300 includes several central databases 305 which are under control by a single DCE 306, e.g. central databases operated by distinct cellular network operators within a given country or one central database for each of a plurality of geographical areas such as for each of several countries.

The databases 304, 305 may, among others, for example store data such as

- Certification data of one or more of the mobile devices 303, e.g. digital and/or dynamic CE marking and/or an alert sign for one or more of the mobile devices 303;
- For each of a one or more types of mobile devices and/or one or more hardware components, a list of authorized 3rd party software that is allowed to be installed and operated on a mobile device of the type or having the hardware component;
- A SDR (Software Defined Radio) reconfiguration log history for one or more of the mobile devices 304, i.e. a list of software modules (and their order of install) that have been installed on one or more reconfigurable mobile devices of the mobile devices 304;
- Opportunistic Spectrum Access data, i.e. data specifying which primary users are currently using a certain spectrum at which time and in which area;
- Context information data, such as a radio environment map database including information on available RATs (Radio Access Technologies) in one or more certain geographic areas.

A local database 304 may for example store data that is relevant for the geographical area with which it is associated, e.g. the coverage area of the mobile radio cell 320 with which the local database 304 is associated. For example, a local database 304 may store opportunistic spectrum access data for the coverage area of the mobile radio cell with which it is associated. It should be noted that a local database 304 may be associated with more than one radio cell 302 and thus may be associated with a larger geographic area.

Similarly, in an embodiment where a central database is associated with a certain geographical area (e.g. a country or regulatory region), it may for example store data that is relevant for the geographical area with which it is associated, e.g. opportunistic spectrum access data for this geographical area or certification data that is valid for this geographical area or a list of allowed $3^{rd}$ party software that is valid for this geographical area.

In the following, possible functionalities of the database coordination entity 306 according to various embodiments are described.

In one embodiment, the database coordination entity 306 provides the functionality of content target storage identification. This is illustrated in FIG. 4.

Figure 4:
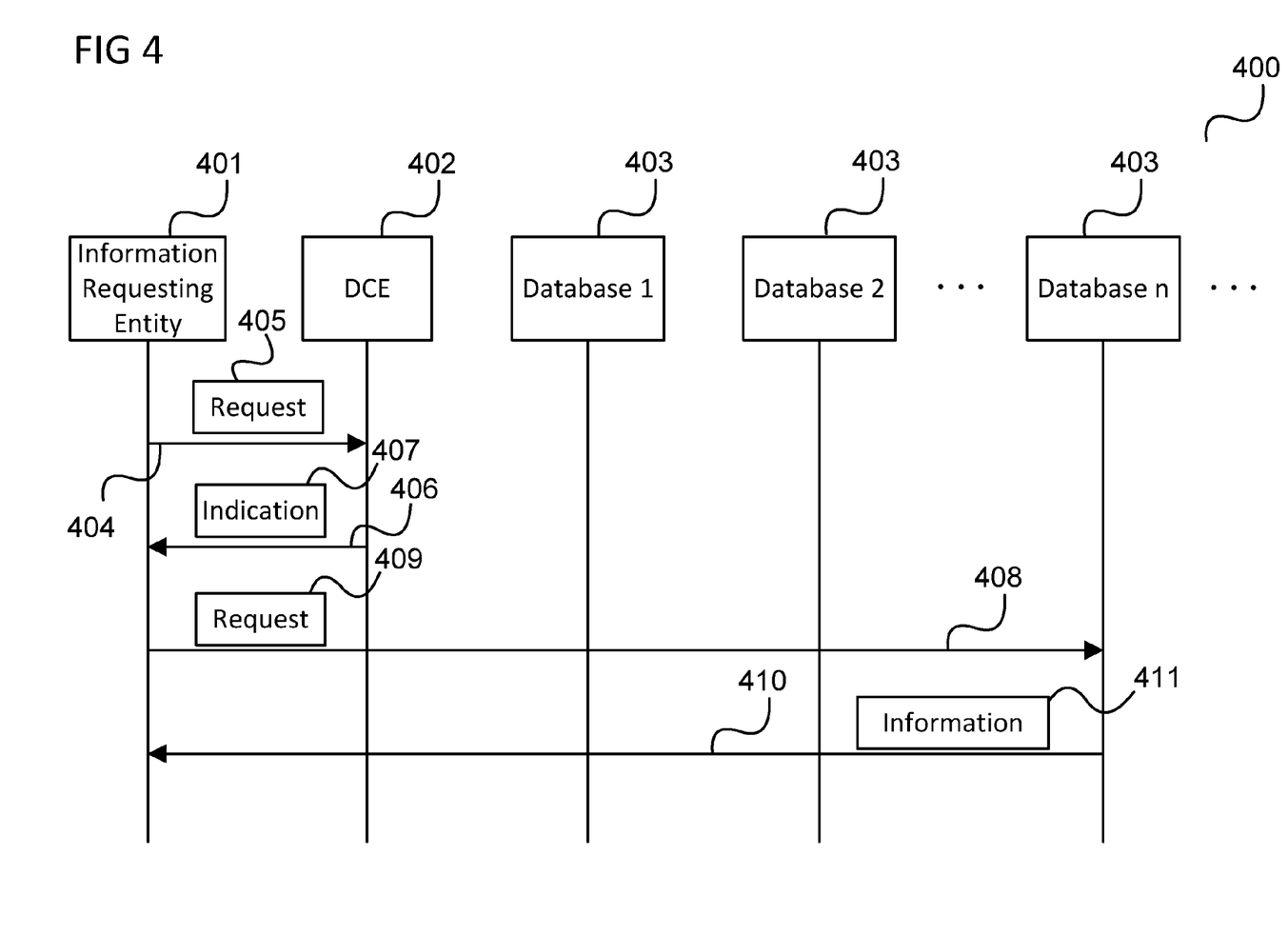
FIG. 4 shows a message flow diagram according to an embodiment.

FIG. 4 shows a message flow diagram 400 according to an embodiment.

The message flow takes place between an information requesting entity 401, a database coordination entity 402, e.g. corresponding to the database coordination entity 306, and a plurality of databases 403, e.g. corresponding to the databases 304, 305.

The information requesting entity may be a communication terminal, e.g. one of the mobile devices 303, or may be another communication device, e.g. a network component of the mobile communication network of which the base stations 301 are part or of another mobile communication network.

In 404, the information requesting entity 401 sends a request 405 to the database coordination entity 402 for an indication of a database of the plurality of databases 403 in which a certain information is stored (e.g. in which a certificate of a certain hardware included in the information requesting entity 401 or a certain software installed on the information requesting entity 401 is stored).

In this embodiment, the database coordination entity 402 is assumed to be aware of the information contained in all the databases 403. Therefore, for the specific information element (e.g. the specific certificate) sought, the database coordination entity 402 can be contacted by the information requesting entity 401 in order to identify the suitable target database (i.e. one of the databases 403 storing the information). This target database may for example depend on whether the information is dependent on a given geographical location, i.e. the target database may be a distributed database (e.g. within a base station 301) or a central database, e.g. operated for a country or a other larger geographical area.

The indication (and also, eventually, the information sought itself) may not only be requested by a mobile device but can be requested by various entities, such as a base station 301, another database 403 trying to identify whether some information elements are already stored in other databases, etc.

In 406, the database coordination entity 402 sends a response message 407 to the information requesting entity 401 including an indication of a suitable database, i.e. of one of the databases 403 storing the information the information requesting entity 401 seeks. The response message 407 may further include information about the location of the suitable database 403 and information about how to access the suitable database 403 (e.g. the IP address etc.).

In 408, the information requesting entity 401 requests the information sought for from the database 403 indicated in the response message 407 by sending a corresponding information request message 409.

In 410, the database 403 transmits the requested information to the information requesting entity using an information transmission message 411.

In case that the suitable database is a centralized database (e.g. the central database 305) the information request message 409 and the information transmission (or delivery) message 411 may for example be transmitted based on a TCP/IP connection between the information requesting entity and the database 403.

In case the database is a local database (e.g. as part of a distributed database) which is for example operated in a cellular basestation (e.g. one of the base stations 301) and the information requesting entity is for example a mobile device the mobile device may request the information based on a TCP/IP connection or by using a (possibly more efficient) message exchange on the MAC (Medium Access Control) layer of a given RAT (radio access technology) used in the radio access network. In this case, for example, the base station learns about the intended database access when the a corresponding MAC frame is decoded in the base station.

In one embodiment, the database coordination entity 306 allows (both distributed and central) databases 304, 305 to request and acquire information from mobile devices 303. This is illustrated in FIG. 5.

Figure 5:
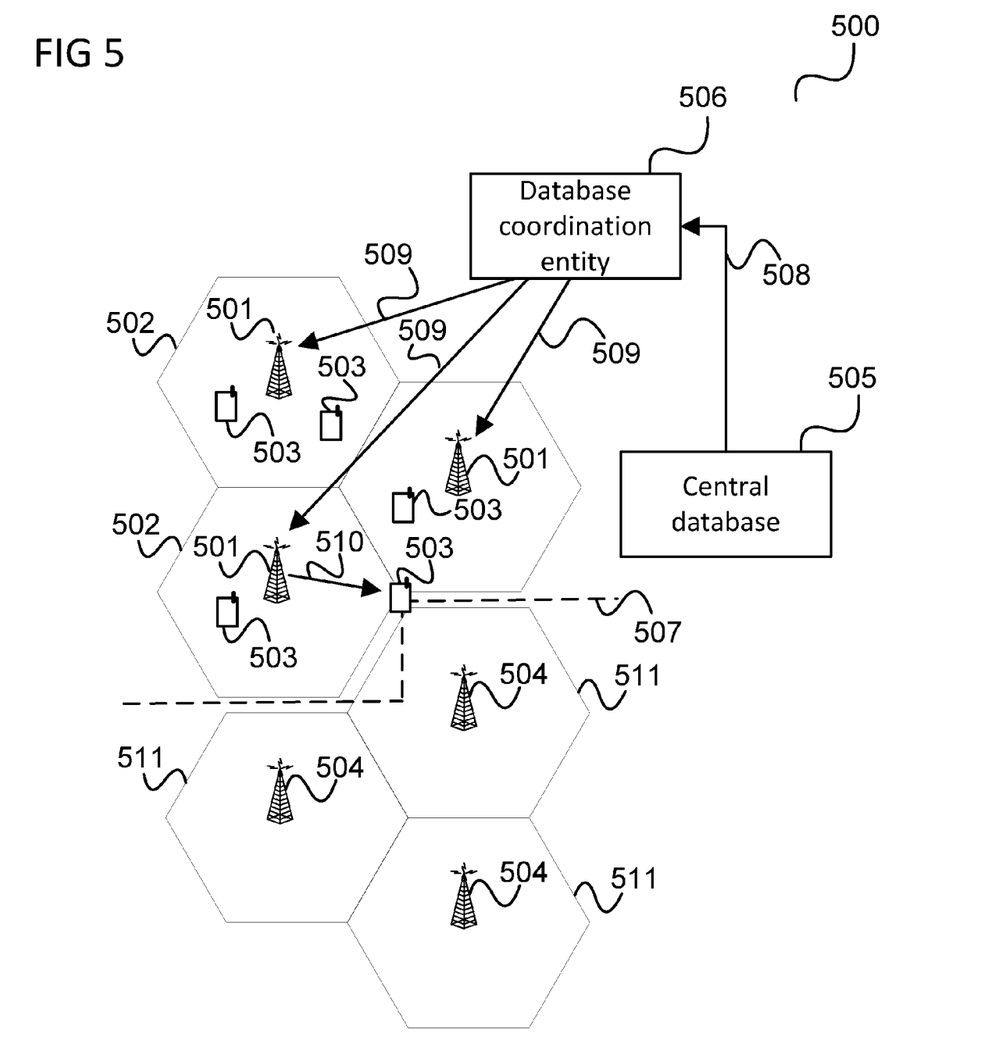
FIG. 5 shows a communication system according to an embodiment.

FIG. 5 shows a communication system 500 according to an embodiment.

The communication system 500 includes a first plurality of base stations 501 corresponding to the plurality of base stations 301 operating a first plurality of radio cells 502 and a plurality of mobile devices 503 located in the first plurality of radio cells 502. The communication system 500 further includes, similarly to the communication system 300 shown in FIG. 3, a central database 505 and a database coordination entity 506.

The communication system 500 further includes a second plurality of base stations 504 operating a second plurality of radio cells 514. The coverage area of the first 502 plurality of radio cells is in this example in a first country and the coverage area of the second plurality of radio cells 514 is in this example in a second country. This is illustrated by a country border 507 running between the first plurality of radio cells 502 and the second plurality of radio cells 514.

For example, the central database 505 may request data from a specific mobile device 503 or all mobile devices 503 of a class of mobile devices. This request may for example be triggered by the database 505. For example, the database 505 may request the reconfiguration history of a mobile device 503 that has been identified as being malfunctioning device.

In case that a single, specific mobile device 503 is concerned by the request, a TCP/IP link may for example be used in order to request the information. Alternatively, for example if a TCP/IP link is not operational, the database coordination entity 506 can provide information on the base station 501 that is maintaining a connection to the concerned mobile device 503. Then, this connection can be used in order to obtain the required information.

In case that a group of mobile devices 503 is concerned by the request, e.g. all mobile devices 503 of a specific mobile device type or all mobile devices 503 operated in a given area (e.g. in the first country or in certain radio cells 502, 505), according to one embodiment, the database coordination entity 506 delivers information related to the concerned base stations 501, 504, i.e. the base stations 501, 504 serving the concerned mobile devices 503. Then, a multicast or a broadcast service can be used by each of the concerned base stations 501, 504 in order to distribute the information to the concerned mobile devices 503.

The database 505 may also acquire context information by distributing sensing and observation tasks on a large number of mobile devices 503 (this is for example referred to as "distributed sensing"). The database coordination entity can be contacted for information about the capabilities of mobile devices 503 in a given area, such that sensing/observation tasks can be efficiently distributed by the database 505.

Further, the database 505 may request data from mobile devices 503 in case that a specific event occurs. This means that in this case, the information request can be seen to not be triggered by the database 505, but the request is for example forwarded to one or more concerned base stations 501, 504 (e.g. by some other entity). If the event occurs for the mobile devices 503 linked to a concerned base station 501, 504 (e.g. located in the radio cell 502, 505 operated by the base station), the information delivery is triggered by the base station 501, 504 and the information may be provided to the concerned database, e.g. the central database 505 or a local database (e.g. a local database 304 as shown in FIG. 3).

As an example, with a first message transmission 508, the central database 505 requests certificates for all installed radio software components of all mobile devices crossing the country border 507. With a second message transmission 509, the database coordination entity 506 instructs the concerned base stations to trigger the mobile devices 503 to deliver the requested software certificates in case that the country border 507 is crossed. With a third message transmission 510, a mobile device crossing the country border 507 is triggered by the concerned base station 501 (e.g. the base station 501 operating the radio cell 502 in which the mobile device 503 is located or that is entered by the mobile device 503) to deliver the requested software certificates to the central base station 505.

For example, a mobile device 503 is located in the first country and close to the country border 507. When the mobile device 503 crosses the country border 507, for example the certificates of software components of the mobile device 503 need to be verified and possibly a reconfiguration of the mobile device 503 needs to be triggered if some or all software certificates are not valid in the neighbouring second country.

In the following, an example of a message flow when a mobile device 203 requests data from a database (local database 304 or central database 305) is explained in the following with reference to FIG. 6.

Figure 6:
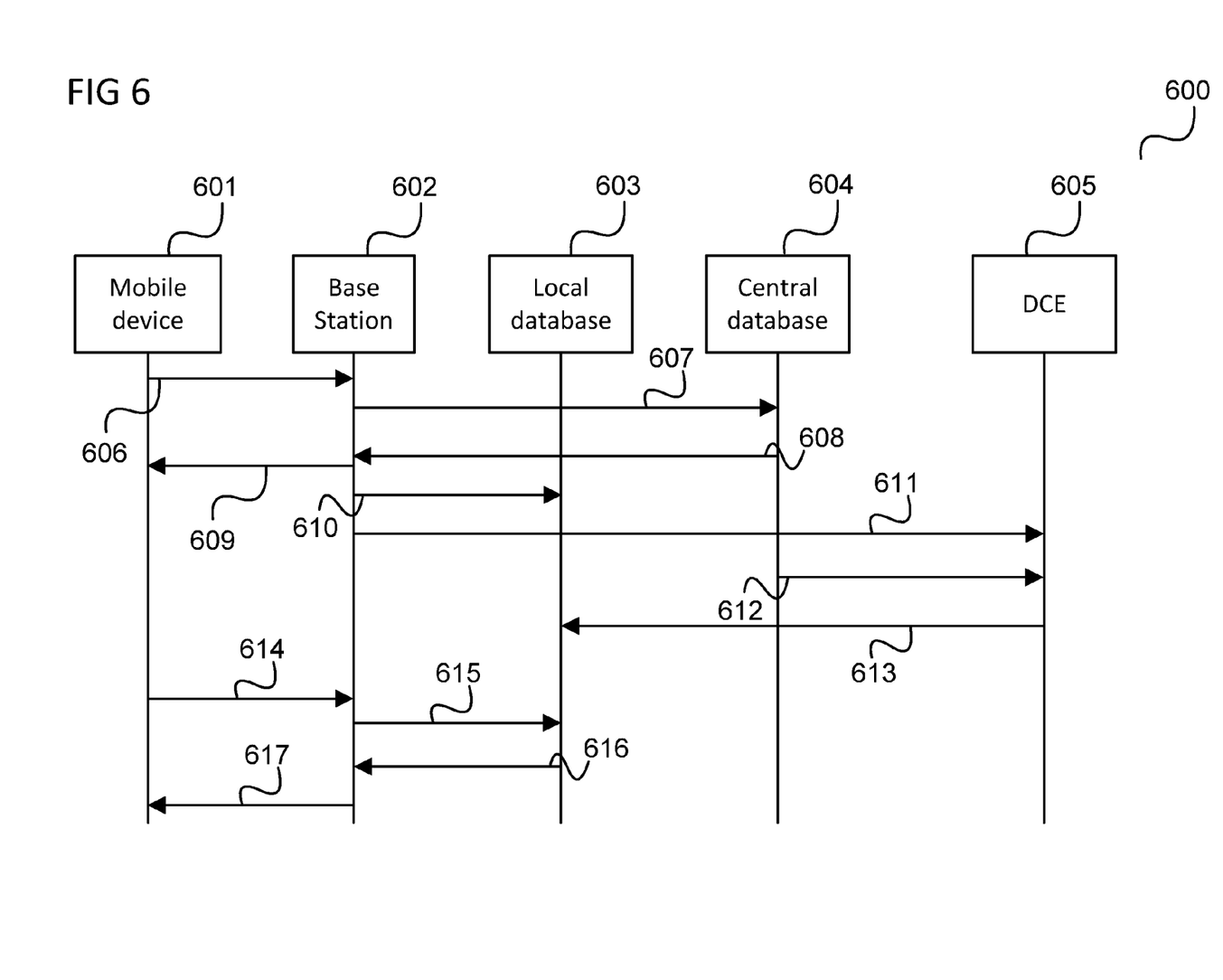
FIG. 6 shows a message flow diagram according to an embodiment.

FIG. 6 shows a message flow diagram 600 according to an embodiment.

The message flow takes place between a mobile device, e.g. corresponding to one of the mobile devices 303, a base station 601, e.g. corresponding to one of the base stations 301 operating the radio cell 302 in which the mobile device 601 is located, a local database 603, e.g. corresponding to the local database 304 associated with the radio cell 302 in which the mobile device 602 is located, a central database 604, e.g. corresponding to the central database 305 and a database coordination entity 605, e.g. corresponding to the database coordination entity 306.

In this example, the mobile device 601 requests data stored in one of the databases 603, 604.

In this example, in 606, for a given geographical area, the mobile device 601 (or a plurality of mobile devices) requests a certain information (e.g. context information), by sending a request to the base station 602 to which it is attached.

In 607, the base station 602 gathers the requested information from the central database 604 (possibly using the support of the data coordination entity 605). In 608, the central database sends the requested information to the base station 602 which forwards the requested information to the mobile device 601 in 609.

In this example, it is assumed that a high number of mobile devices 303 (e.g. a number above predetermined threshold) have requested the same information that has now been again requested by the mobile device 601 or have requested the information simultaneously with the mobile device 601. In the latter case, the information may be forwarded in 609 by the base station 602 using multicast or broadcast.

In this case of request of the same information by a high number of mobile devices, the base station 602, in 610, stores the information retrieved from the central database in the local database 603 (or in a plurality of local databases), for example maintained by the base station 602. The local database 603 may be set up by the base station 602 for this purpose or the information may be stored in an existing local database.

In 611, the base station 602 informs the database coordination entity 605 about the setup of the local database or the storing of the information in the local database.

In case that information that is also stored in the local database 602 changes in the central database 604 (e.g. the validity of a certificate is changed), the central database 604 informs the database coordination entity 605 about this change in 612. The database coordination entity 605 triggers a corresponding update of the information in the local database 603 (and possibly further local databases storing this information) in 613.

When information has been stored in the local database 603 and this information is again requested by the mobile device 601 (which may be different from the one doing the request in 606) in 614, the base station 602 requests the information from the local database 603 in 615 which delivers the information to the base station 602 in 616. The base station 602 in 617 then delivers the information to the mobile device 601. Thus, once it has been stored in the local database 603, the information is transported to the requesting mobile device or mobile devices from the local database 603, thus reducing the necessary interactions between the base station 602 and the central database 605.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. One or more non-transitory, computer-readable media having instructions that, when executed, cause a device to:
store, in a memory, a plurality of database indicators and a plurality of database descriptions, wherein each database indicator includes information for accessing a database having content described by the associated database description, and wherein each database is associated with one or more regions within a mobile communication network;
store, in the memory, associations between the plurality of database indicators and certificates of operation for a plurality of communication terminals associated with the mobile communication network;
receive a communication resulting from one or more of the communication terminals being associated with an incompatible certificate of operation, wherein the one or more communication terminals are located within a particular region of the mobile communication network;
determine, from the memory, a database indicator associated with the communication based, at least in part, on the particular region where the one or more communication terminals are located; and
transmit the determined database indicator in response to receiving the communication, wherein the database indicator provides the one or more communication terminals with database access for obtaining a compatible certificate that comprises a hardware certificate to specify that a communication terminal is allowed to operate a certain hardware in the mobile communication network or a software certificate to specify that the communication terminal is allowed to operate a certain software in the mobile communication network,
wherein: a first database is associated with a first region of the mobile communication network; a second database is associated with a second region of the mobile communication network; the communication is to be received in response to the one or more communication terminals moving from the first region to the second region; and the database indicator is to provide the one or more communication terminals with access to the second database for obtaining the compatible certificate.

2. The one or more non-transitory, computer-readable media of claim 1, wherein the communication terminal is to transmit a request for the database indicator, and wherein the communication terminal is a subscriber terminal of the mobile communication network.

3. The one or more non-transitory, computer-readable media of claim 2, wherein the request identifies the communication terminal.

4. The one or more non-transitory, computer-readable media of claim 1, wherein the instructions, when executed, further cause the device to:
- receive information that a database has been set up; and
- in response to receipt of the information that the database has been set up, include an indicator of the database in the memory.

5. The one or more non-transitory, computer-readable media of claim 1, wherein a plurality of databases comprises a central database communicatively coupled to a local database associated with the particular region where the one or more communication terminals are located, wherein the selected database indicator identifies the central database, and wherein the database indicator provides the one or more communication terminals with access to the central database for obtaining the compatible certificate of operation, and the instructions, when executed, further cause the device to:
- upon an update of a certificate of operation stored in the central database, send an update message to the local database to inform the local database about the update.

6. The one or more non-transitory, computer-readable media of claim 5, wherein the instructions, when executed, further cause the device to:
- in response to receiving a subsequent communication from one or more additional communication terminals located in the particular region, transmit a second database indicator identifying the local database, wherein the second database indicator provides the additional communication terminals with access to the local database for obtaining the compatible certificate.

7. The one or more non-transitory, computer-readable media of claim 1, wherein the one or more regions comprise a plurality of geographical regions and associations between each database indicator and a geographical region, and wherein the database indicator is selected based, at least in part, on a particular geographic region where the one or more communication terminals are located.

8. The one or more non-transitory, computer-readable media of claim 1, wherein the instructions, when executed, further cause the device to:
- store a plurality of hardware or software indicators;
- store associations between the plurality of hardware or software indicators and a corresponding plurality of database indicators;
- each of the hardware or software indicators is associated with a database indicator; and
- the communication includes a hardware or software indicator.

* * * * *